July 29, 1930.  E. H. McCLOUD  1,771,580
AUTOMOBILE BUMPER
Filed Nov. 9, 1929
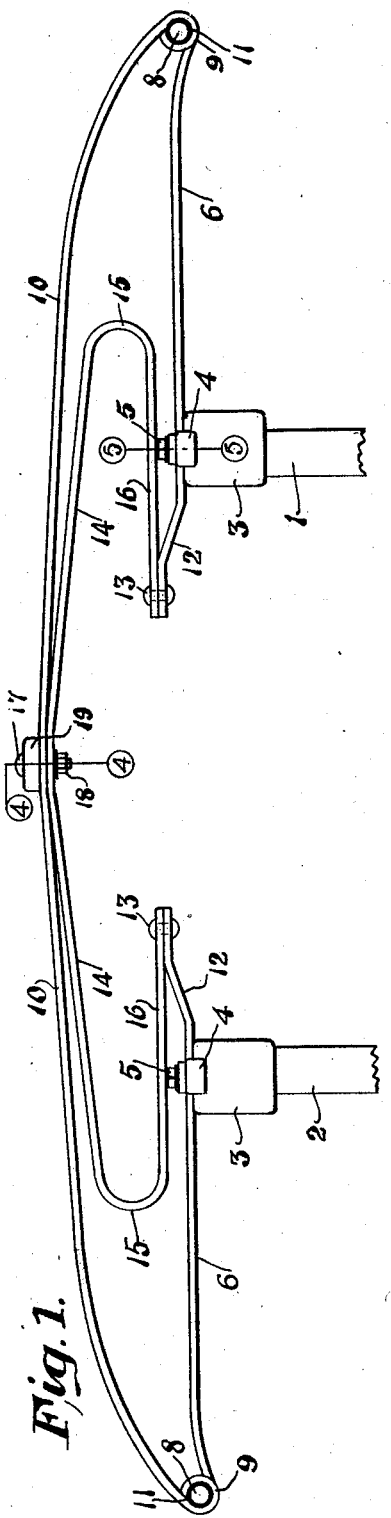
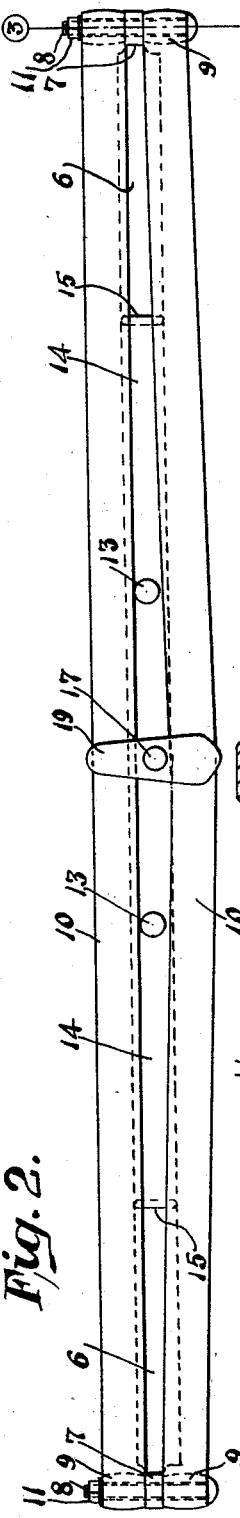
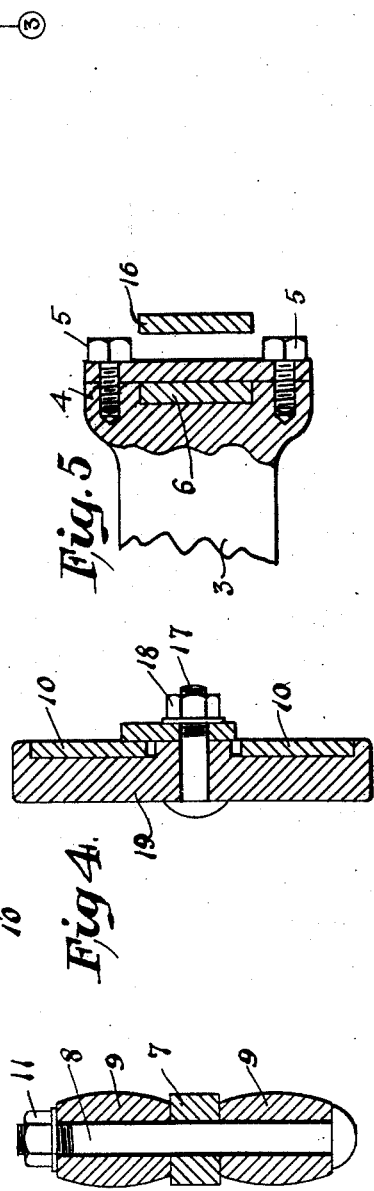
Inventor
EDWARD H. McCLOUD, Patented July 29, 1930

1,771,580

UNITED STATES PATENT OFFICE

EDWARD H. McCLOUD, OF COLUMBUS, OHIO

AUTOMOBILE BUMPER

Application filed November 9, 1929. Serial No. 405,930.

My invention relates to automobile bumpers.

It is the object of my invention to provide an automobile bumper in which there will be an equal distribution of impacts and the force thereof on the several parts of the bumper with respect to the frame members of the vehicle to which the bumper is attached.

It is a further object to provide a bumper in which, due to this distribution of impacts, there will be no resulting spreading of the frame of the vehicle.

It is a further object to provide for spring support of the bumper centrally and at the ends and for distributing the impact on opposite sides of the frame member and on opposite ends of the support for the free ends of the bumper and for the central supporting means of the bumper.

It is a further object to provide a bumper in which there may be a distribution of the impact equal on both sides of the frame ends and upon both frame ends without having a continuous back bar and without preventing access to the automobile to crank it and without preventing the carrying of a spare tire between the vehicle and the bumper within the bumper.

It is a further object to provide a bumper in which any impact imparted to the central support of the bumper will be transmitted to a yielding member carried on the vehicle frame at a point within the frame between the frame members in counterbalance to the impact imparted to the bumper which is transmitted through the ends of the bumper to the other ends of the said member which serves to support the bumper on the frame.

Referring to the drawings:

Figure 1 is a top plan view thereof;

Figure 2 is a front elevation thereof;

Figure 3 is a section on the line 3—3 of Figure 2;

Figure 4 is a section on the line 4—4 of Figure 1;

Figure 5 is a section on the line 5—5 of Figure 1.

Referring to the drawings in detail, 1 and 2 represent frame members on which are mounted the pads 3 that carry clamps 4 which are retained on the pads 3 by the bolts 5. These pads support spring plate supporting bars 6 flat against the end of the frames 1 and 2. It will be noted that one end of the support 6 is formed into an eye 7 and is mounted upon the bolt 8 upon which are also mounted the eyes 9 of the upper and lower bumper bars 10. The eye 7 serves as a spacer between the eyes 9 of the bars 10. The tightening of the nut 11 on the bolt 8 serves to hold these ends vertical in position with one another but to permit rotation around the bolts in horizontal planes.

The inner end of the supporting bar 6, as at 12, provides a spring bar for supporting through the rivet 13 the inner end of the spring support and buffer plate 14 which is provided with a side loop 15 and an inward extension 16 that is connected to the end 12 of the bar 6 by the rivet 13.

The center of this inner spring member 14 which is located in a plane horizontally approximately between the bumper bars 10 is connected by the bolt 17 and nut 18 with the center clamp 19 to the front bumper bars 10, thus positioning them, supporting them and receiving the shock of impact with them.

It will be noted that there is appreciable space between the ends of bars 12 and 16 so that ready access to the front of the car for cranking the engine is possible; and further, if the bumper is used on the rear of the car there is sufficient space within the member 14 to accommodate a tire.

In operation, any impact on the bumper bars 10 and 10 will be distributed so that one portion will travel to one side of the bumper and the other to another side of the bumper. Such portions will again be divided, one part of the impact flexing the member 14, curved portion 15, bar 16 and bar 12, while another portion of the impact will flex the front bars 10 and the supporting bars 6. This flexing can be proportioned so that both parts or groups of parts on either side of the frame member will carry approximately half of the load thus equalizing and distributing the impact and tending to prevent twisting of the bumper supporting bar 6 from its seat on the end of the frame and thereby spreading of the frame. Heretofore, the connecting of the impact bars directed to the frame members through a triangular construction has provided a very rigid structure which would not give except by spreading the frame member.

By transmitting this force on both sides of the respective frame members the shock is largely taken up by the resilient components of the bumper instead of its being transmitted into the frame to injure or spread the frame of the vehicle.

It will be understood that I desire to comprehend within my invention such modifications as may be clearly embraced within the scope of my claims and invention.

Having thus fully described my invention, what I claim as new and desire to secure by Letters Patent, is:

1. In a bumper, frame members, bumper supporting members extending across the frame members on either side of the end thereof, a bumper means connected to the outside ends of said supporting members, additional bumper supporting means connected to the ends of the first bumper supporting members on the inside of the frame members.

2. In a bumper, frame members, bumper supporting members extending across the frame members on either side of the end thereof, a bumper means connected to the outside ends of said supporting members, additional bumper supporting means connected to the ends of the bumper supporting members on the inside of the frame members and the bumper means.

3. In a bumper, frame members, bumper supporting members extending across the frame members on either side of the end thereof, a bumper means connected to the outside ends of said supporting members, additional bumper supporting means connected to the ends of the bumper supporting members on the inside of the frame members and to the bumper at the center of the bumper means.

4. In a bumper, frame members, bumper supporting members extending across the frame members on either side of the end thereof, a bumper means connected to the outside ends of said supporting members, additional bumper supporting means connected to the ends of the bumper supporting members on the inside of the frame members and to the bumper means at the center of the bumper between the frame members.

5. In combination, spaced frame members, supporting bars extending across the ends thereof on either side thereof, a bumper connected to both ends of said supporting bars on both sides of each frame member whereby the impact on the bumper will be distributed on either side of each frame member, the inner ends of said supporting bars being connected only to the central portion of the bumper.

6. In combination, spaced frame members, supporting bars extending across the ends thereof on either side thereof, a bumper connected to both ends of said supporting bars on both sides of each frame member whereby the impact on the bumper will be distributed on either side of each frame member, and yielding means connecting the inner ends of said supporting bars to the central portion only of the bumper.

7. In combination in a bumper, spaced frame members, spring supporting plates extending across the ends thereof, bumper bars connected to the outside ends of said spring plates and an inner spring bumper member comprising end plates, U-shaped ends and integrally extending members connected to the inner ends of said spring plates in substantially parallel relationship thereto.

8. In combination in a bumper, spaced frame members, spring supporting plates extending across the ends thereof, bumper bars connected to the outside ends of said spring plates, an inner spring bumper comprising end plates, U-shaped ends and integrally extending members connected to the inner ends of said spring plates in substantially parallel relationship thereto at points within said frame members.

9. In combination in a bumper, spaced frame members, spring supporting plates extending across the ends thereof, bumper bars connected to the outside ends of said spring plates, an inner spring bumper member comprising end plates, U-shaped ends and integrally extending members connected to the inner ends of said spring plates in substantially parallel relationship thereto at points within said frame members but spaced from one another.

10. In combination, spaced frame members, supporting plates mounted on the ends thereof extending on either side of the frame members, arcuate bumper bars pivotally carried on the ends of the supporting members and means for rigidly attaching the center portion of said bumper bars to the inner ends of said supporting members.

11. In combination, spaced frame members, supporting plates mounted on the ends thereof extending on either side of the frame members, arcuate bumper bars pivotally carried on the ends of the supporting members and means for rigidly attaching the center portion of said bumper bars to the inner ends of said supporting members, said means comprising a U-shaped spring plate member.

12. In combination, spaced frame members, vertically disposed supporting spring plates mounted across the ends thereof, bumper bars pivoted on the outside ends of said plates and a spring plate member connected to said bumper bars adjacent the middle thereof and having U-shaped ends with integrally turned ends permanently attached to the inner ends of the supporting spring plates.

13. In combination, spaced frame members, vertically disposed supporting spring plates mounted across the ends thereof, bumper bars pivoted on the outside ends of said plates and a spring plate member connected to said bumper bars adjacent the middle thereof and having U-shaped ends with integrally turned ends permanently attached to the inner ends of the supporting spring plates, the inner ends of said supporting spring plates being arranged to engage therewith in parallel relationship.

14. In a bumper, spaced frame members, impact members having their ends turned rearwardly, an inner buffer member having its ends turned rearwardly and inwardly and supporting spring plates mounted on the frame member ends and connected respectively to the buffer member and the impact members respectively at points outside of and between the frame members.

15. In a bumper, spaced frame members, impact members having their ends turned rearwardly, an inner buffer member having its ends turned rearwardly and inwardly and supporting spring plates mounted on the frame member ends and connected respectively to the buffer member and the impact members respectively at points outside of and between the frame members and means for attaching said impact members to one another at the mid point of each.

16. In a bumper, spaced frame members, supporting spring plates extending across the ends thereof but spaced from each other, an impact receiving means pivoted to the outer ends of said plates and a buffer means connected to said impact receiving means and to the inner ends of said spring plates, whereby, when said impact receiving means flex the outer ends of the spring plates the buffer means will bend the inner ends of the spring plates.

17. In a bumper, spaced frame members, supporting spring plates extending across the ends thereof but spaced from each other, an impact receiving means pivoted to the outer ends of said plates and a buffer means connected to the impact receiving means and to the inner ends of said spring plates whereby, when said impact receiving means flex, they will bend the outer ends of the spring plates and the buffer means will bend the inner ends of the spring plates, said buffer means and spring plates being in the same plane.

18. In a bumper, spaced frame members, supporting spring plates extending across the ends thereof but spaced from each other, an impact receiving means pivoted to the outer ends of said plates and a buffer means connected to the impact receiving means and to the inner ends of said spring plates, whereby, when said impact receiving means flex, they will bend the outer ends of the spring plates and the buffer means will bend the inner ends of the spring plates, said buffer means and the spring plates being in the same plane and the impact receiving means being arranged in spaced relationship in planes on either side of the buffer means and the spring plates.

In testimony whereof I affix my signature.
EDWARD H. McCLOUD.